US012407131B2

(12) United States Patent
Kim

(10) Patent No.: US 12,407,131 B2
(45) Date of Patent: Sep. 2, 2025

(54) CONNECTOR WITH WATER INGRESS PROTECTION COVER

(71) Applicants: Hyundai Motor Company, Seoul (KR); Kia Corporation, Seoul (KR)

(72) Inventor: Jong Hwi Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 307 days.

(21) Appl. No.: 18/216,322

(22) Filed: Jun. 29, 2023

(65) Prior Publication Data

US 2024/0128679 A1 Apr. 18, 2024

(30) Foreign Application Priority Data

Oct. 12, 2022 (KR) ........................ 10-2022-0130635

(51) Int. Cl.
*H01R 24/00* (2011.01)
*H01R 13/52* (2006.01)

(52) U.S. Cl.
CPC ......... *H01R 13/5213* (2013.01); *H01R 24/00* (2013.01)

(58) Field of Classification Search
None
See application file for complete search history.

(56) References Cited

U.S. PATENT DOCUMENTS 11,121,499 B2 * 9/2021 Trigg ..................... H01R 31/08

* cited by examiner

*Primary Examiner* — Tho D Ta
(74) *Attorney, Agent, or Firm* — Slater Matsil, LLP

(57) ABSTRACT

An embodiment connector with a water ingress protection cover includes a female connector including a housing having a pair of guide holes extended along a first direction at both sides thereof and a first body extended from the housing, a male connector, a first cover mounted to an upper part of the female connector to be movable along the pair of guide holes, and a second cover mounted to an upper part of the male connector. The first cover is configured to move in the first direction to a position over the first body by the second cover or the male connector during coupling of the male connector to the female connector, and the second cover is positioned over the housing and coupled to the first cover in a state in which the male connector is coupled to the female connector.

20 Claims, 17 Drawing Sheets

Section A-A

Section B-B

CONNECTOR WITH WATER INGRESS PROTECTION COVER

CROSS-REFERENCE TO RELATED APPLICATIONS

This application claims the benefit of Korean Patent Application No. 10-2022-0130635, filed on Oct. 12, 2022, which application is hereby incorporated herein by reference.

TECHNICAL FIELD

The present invention relates to a connector with a water ingress protection cover.

BACKGROUND

In recent years, connectors for connecting electronic components to each other have been widely used in vehicles due to the electrification trend.

Connectors are widely used not only outside the vehicle but also inside the vehicle, and there is a very rare chance for water to get into the vehicle, but water or chemicals may fall on top of a connector due to a work such as tinting on the inner surface of the windshield or side glasses or a moisture-resistant coating.

According to the prior art, a multi-box is used to cover a connector to prevent water from entering into the connector.

According to the prior art, multi-boxes of various dimensions are required to cover various connectors, thereby causing a problem of cost increase.

In addition, the above-described operations are regularly performed when water falls on an upper part of the connector, such that only the upper part of the connector can be blocked from water drops, but the multi-box closes the entire connector occupying a large amount of space in the vehicle, thereby causing difficulties in assembling vehicle parts, deteriorating the degree of freedom in designing the vehicle, etc.

Therefore, there is a need for a method to solve problems in the art.

It should be understood that the above-described background technology is only for the purpose of enhancing understanding of the background of embodiments of the present invention and does not mean that the background technology corresponds to a prior technology that is already known to those skilled in the art.

SUMMARY

The present invention relates to a connector with a water ingress protection cover. Particular embodiments relate to a connector having a cover for blocking water falling from an upper part of a connector.

Various embodiments of the present disclosure provide a connector having a first cover and a second cover which are respectively provided on an upper part of a male connector and a female connector and having a new type of a water ingress protection cover which protects the upper parts of the male connector and the female connector from falling water when the male connector and the female connector are coupled.

According to at least one embodiment of the present disclosure, the connector with a water ingress protection cover comprises a female connector including a housing having a pair of guide holes extended along a first direction at both sides thereof and a first body extended from the housing, a male connector, a first cover mounted to an upper part of the female connector movably along the pair of guide holes and a second cover mounted to an upper part of the male connector, wherein the first cover is moved in the first direction to a position over the first body by the second cover or the male connector when the male connector is coupled to the female connector, and the second cover is positioned over the housing with being coupled to the first cover when the male connector is coupled to the female connector.

In at least one embodiment of the present disclosure, the first cover is moved to a position over the housing by the second cover or the male connector when the male connector is separated from the female connector.

In at least one embodiment of the present disclosure, the first cover comprises a first upper surface and a first side surface extending downward from both ends of the first upper surface, and the second cover comprises a second upper surface and a second side surface extending downward from both ends of the second upper surface.

In at least one embodiment of the present disclosure, a first protrusion is formed at one end in the first direction and a second protrusion is formed at the other end on outer surfaces of the first upper surface and the first side surface, and a third protrusion is formed at one end in the first direction on outer surfaces of the second upper surface and the second side surface.

In at least one embodiment of the present disclosure, the second protrusion is formed at a position a predetermined distance apart from the other end in the first direction.

In at least one embodiment of the present disclosure, the second cover has a protrusion groove which the second protrusion is inserted in.

In at least one embodiment of the present disclosure, the connector further comprises a coupling mechanism configured to couple the male connector and the first cover.

In at least one embodiment of the present disclosure, the coupling mechanism comprises a first coupling element formed on the male connector or the second cover and a second coupling element formed in the first cover.

In at least one embodiment of the present disclosure, the first coupling element comprises a bump comprising a first inclined surface formed at one side thereof and a second inclined surface formed at the other side thereof, and the second coupling element comprises a pair of protrusions protruding from inner surfaces of the first cover and coupled to the pair of guide holes.

In at least one embodiment of the present disclosure, the first coupling element comprises a first protrusion formed on an outer surface of the first cover, and the second coupling element comprises a second protrusion formed on an inner surface of the second cover.

When the male connector and the female connector are coupled, the first cover and the second cover are coupled so as to achieve an effect of preventing water from entering into the connector.

Embodiments of the present disclosure are not limited to the above-mentioned embodiments, and other embodiments not mentioned will be clearly understood from the following description by those skilled in the art to which the present disclosure pertains.

Figure 1:
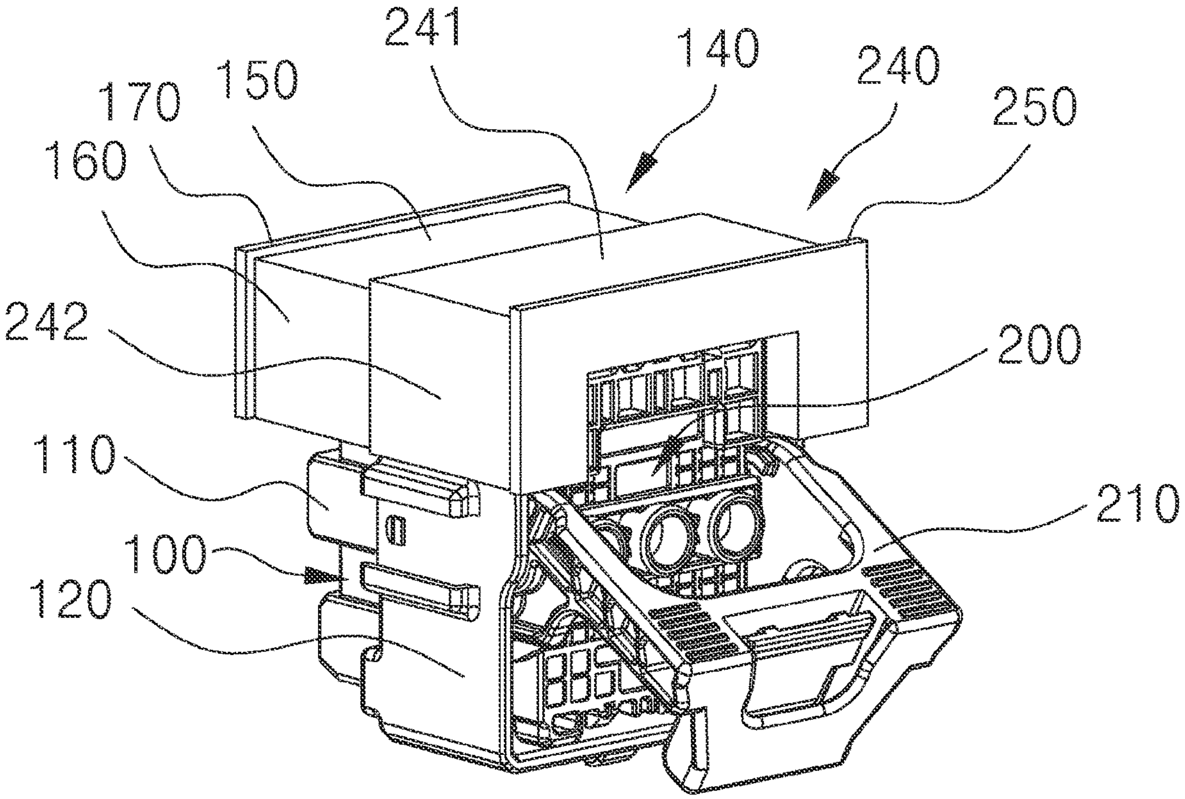
FIG. 1 is a drawing illustrating a connector with a water ingress protection cover according to an embodiment of the present disclosure.
Figure 2:
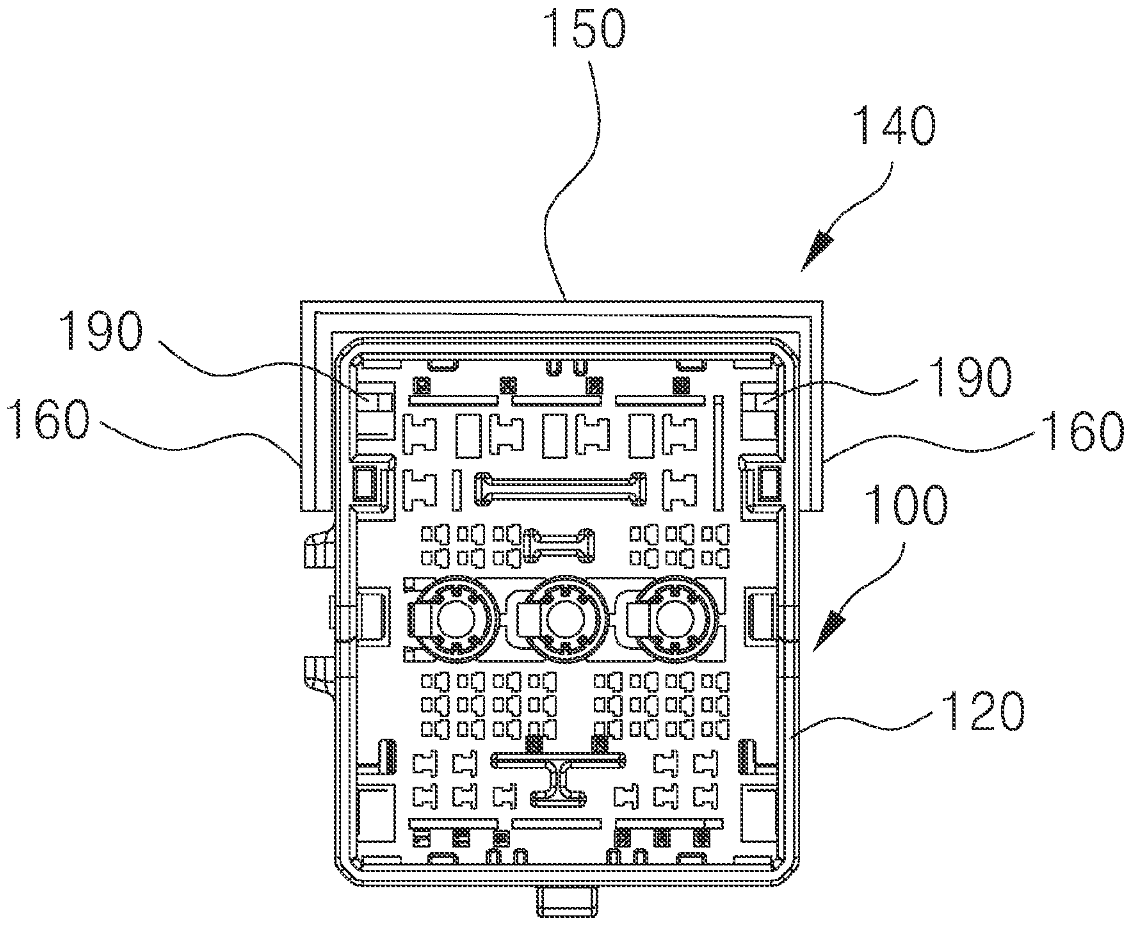
FIG. 2 is a drawing illustrating a female connector of the connector with a water ingress protection cover according to an embodiment of the present disclosure.
Figure 3:
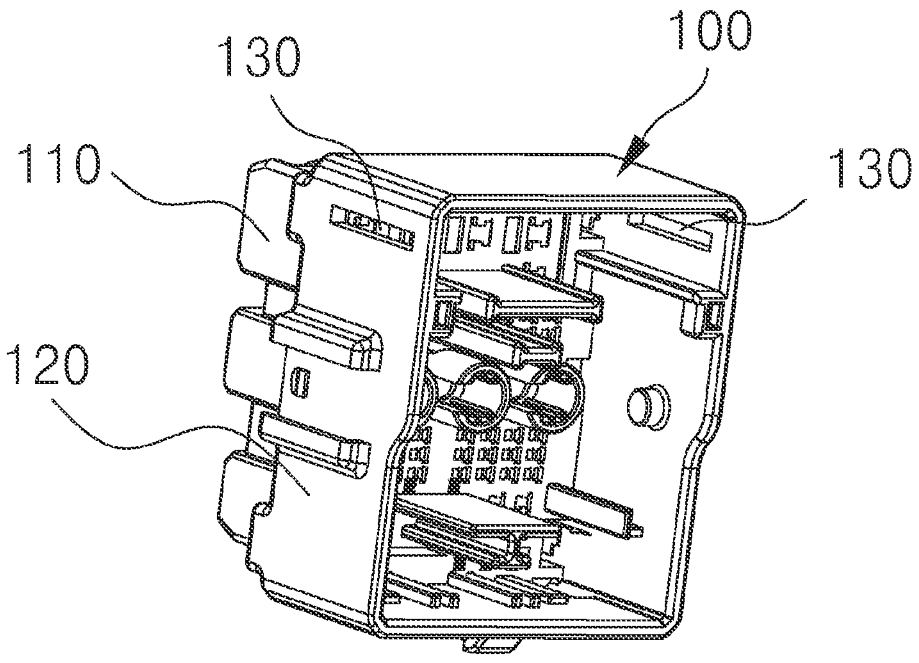
FIG. 3 is a drawing illustrating a female connector in which a first cover is separated from a connector with a water ingress protection cover according to an embodiment of the present disclosure.

The following reference identifiers may be used in connection with the figures to describe exemplary embodiments of the present invention.

| | |
|---|---|
| 100: Female connector | 110: First body |
| 120: Housing | 130: Guide hole |
| 140: First cover | 150: First upper surface |
| 160: First side surface | 170: First protrusion |
| 180: Second protrusion | 190: Protrusion |
| 200: Male connector | 210: Handle |
| 220: Second body | 230: Terminal hole |
| 240: Second cover | 241: Second upper surface |

-continued

| | |
|---|---|
| 242: Second side surface | 250: Third protrusion |
| 260: Protrusion groove | 270: First coupling element |
| 280: First inclined surface | 290: Second inclined surface |
| 300: Bump | 310: Second coupling element |
| 320: First protrusion | 330: Second protrusion |

DETAILED DESCRIPTION OF ILLUSTRATIVE EMBODIMENTS

Since embodiments of the present disclosure may be modified in various ways and may have various embodiments, specific embodiments will be illustrated and described in the accompanying drawings. However, this is not intended to limit embodiments of the present invention to specific embodiments, and it should be understood that embodiments of the present invention include all modifications, equivalents, and replacements included on the idea and technical field of embodiments of the present invention.

Terms including ordinals such as "first," "second," etc., may be used to describe various elements, but the components are not limited by these terms. The terms are used only for the purpose of distinguishing one component from another component.

The term "and/or" may be used to include any combination of a plurality of items to be included. For example, "A and/or B" includes all three cases such as "A," "B," and "A and B."

When a component is mentioned as being "connected" or "linked" to another component, the component may be directly connected or linked to the other component, but it should be understood that another component may exist in between. On the other hand, when it is mentioned that a component is "directly connected" or "directly linked" to another component, it should be understood that another component does not exist in between.

In the description of embodiments, it will be understood that a layer (film), region, pattern, or structure is formed "on" or "under" another layer (film), region, pad, or pattern, either directly or through intervening layers. The reference to "up/on" or "down/under" is based on the elements shown in the drawings for convenience of explanation, is used to show the relative positional relationship between the components for convenience of explanation, and should not be understood as limiting the actual positions of the components. For example, "above B" is merely an indication that B is shown above A in the drawings, unless otherwise stated or A should not be positioned above B due to the property of A or B, B may be positioned below A or B, and A may be disposed adjacently in the actual product or the like.

In addition, a density or a size of each layer (film), region, pattern, or structure in the drawings may be modified for clarity and convenience of the description, and thus does not entirely reflect the actual size.

The terminology used herein is for the purpose of describing particular embodiments only and is not intended to be limiting of embodiments of the present disclosure. Singular expressions include plural expressions, unless the context clearly indicates otherwise. In the present application, it should be understood that the term "include" or "have" indicates that a feature, a number, a step, an operation, a component, a part, or a combination thereof described in the specification is present, but does not exclude the possibility of existence or addition of one or more other features, numbers, steps, operations, components, parts, or combinations thereof in advance.

Unless otherwise defined, all terms used herein, including technical or scientific terms, have the same meaning that is generally understood by those skilled in the art to which embodiments of the present invention pertain. It will be further understood that terms, such as those defined in commonly used dictionaries, should be interpreted as having a meaning that is consistent with their meaning in the context of the relevant art and will not be interpreted in an idealized or a strictly formal meaning unless expressly so defined herein.

Hereinafter, exemplary embodiments will be described in detail with reference to the accompanying drawings, in which like reference numerals refer to like or corresponding elements throughout the figures, and repetitive descriptions thereof will be omitted.

The connector with a water ingress protection cover according to embodiments of the present disclosure comprises a female connector 100, a male connector 200, a first cover 140, and a second cover 240.

The female connector 100 comprises a first body 110 and a housing 120 formed at one side of the first body 110, a pair of guide holes 130 are formed at both sides of the housing 120, and a protrusion 190, which will be described later, is inserted into the guide hole 130 to be guided by sliding. A plurality of first terminals (not shown) may be fixed to the first body 110 by an insert molding process with first ends thereof exposed to the housing 120.

The male connector 200 includes a second body 220 having a size to be inserted into the housing 120.

The second body 220 includes a plurality of terminal holes 230 where a plurality of first terminals exposed to the housing 120 are inserted, and a second terminal (not shown) contacting the first terminal is provided in the second body 220 by insert molding process.

The male connector 200 is provided with a handle 210 to easily separate the second body 220 inserted into the housing 120.

The first cover 140 is mounted at the upper part of the female connector 100 to be slidable in a first direction, i.e., the coupling direction of the male connector 200.

The first cover 140 includes a first upper surface 150 and a pair of first side surfaces 160 extending downward from both ends of the first upper surface 150.

Figure 6:
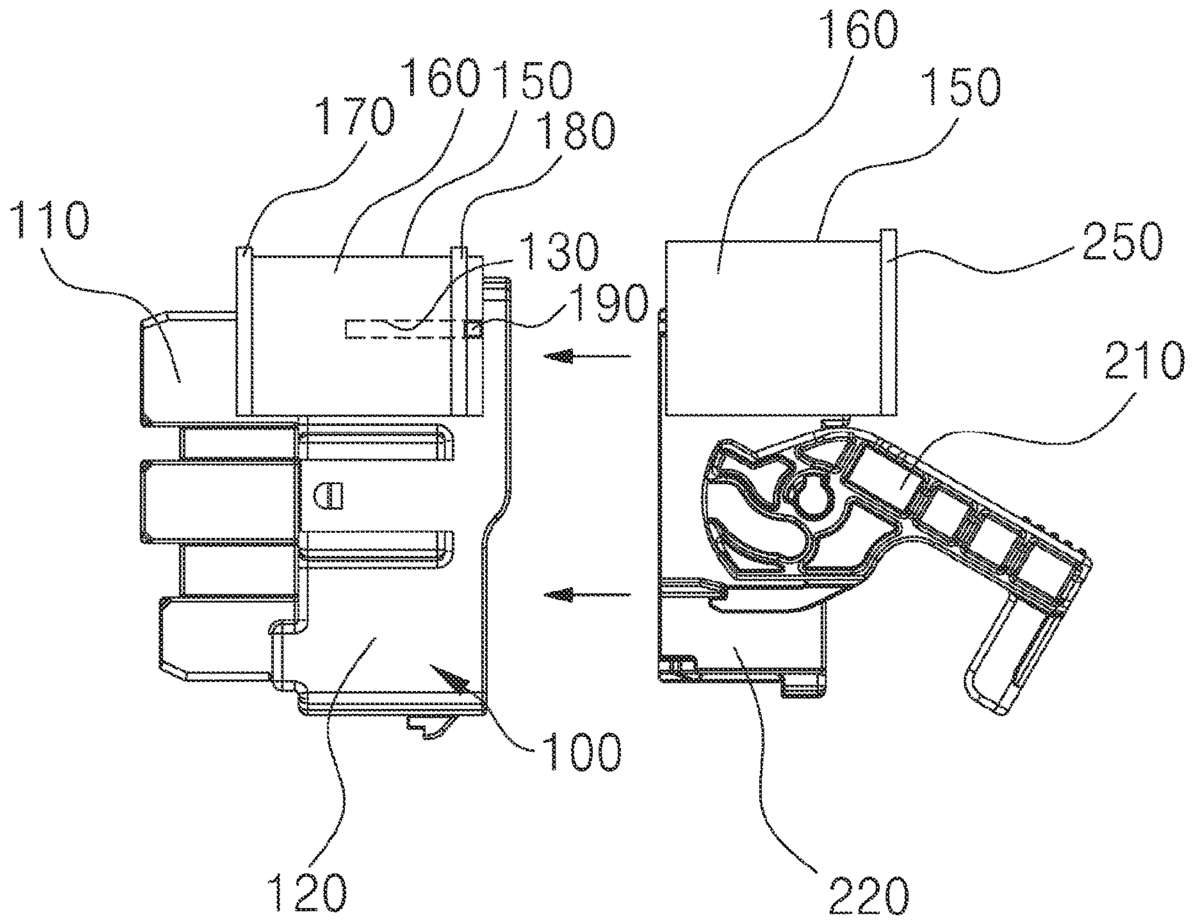
FIG. 6 is a drawing illustrating a state in which a male connector is coupled to a female connector in a connector with a water ingress protection cover according to an embodiment of the present disclosure.
Figure 12:
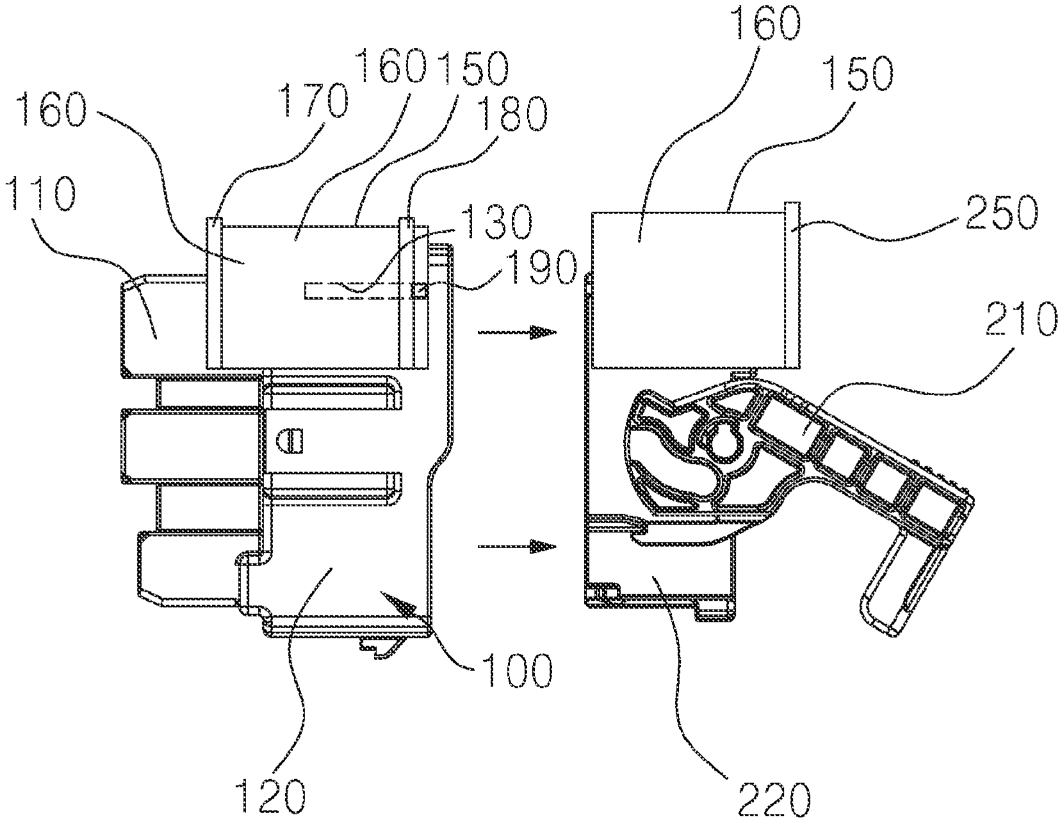
FIG. 12 is a drawing illustrating a state in which a male connector is separated from a female connector in a connector with a water ingress protection cover according to an embodiment of the present invention.
Figure 13:
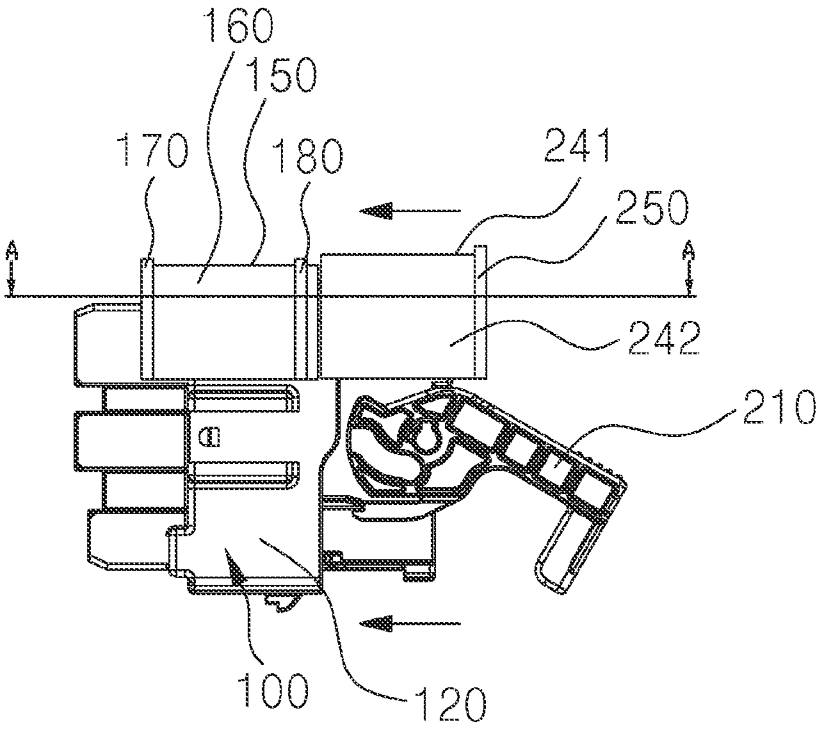
FIG. 13 is a drawing illustrating a state in which a male connector is coupled to a female connector in a connector with a water ingress protection cover according to an embodiment of the present invention.

In the first upper surface 150 and the first side surfaces 160, as shown in FIGS. 6 and 12, a first protrusion 170 is formed at one end and a second protrusion 180 is formed at the other end.

The second protrusion 180 is formed at a position apart from the other end at a preset distance.

Figure 4:
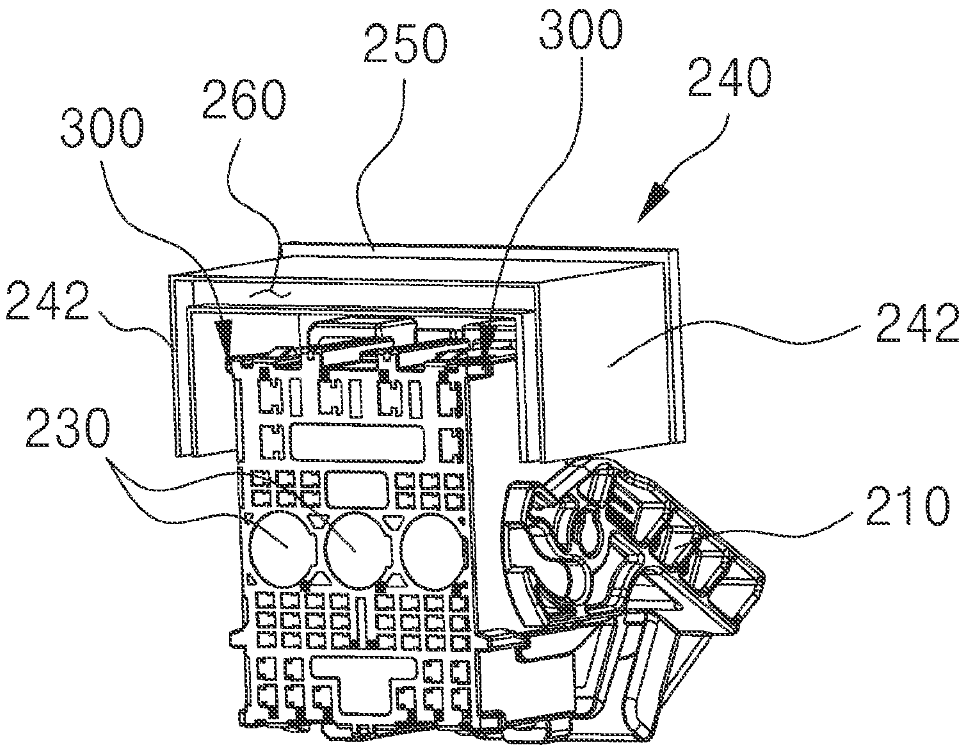
FIG. 4 is a drawing illustrating a male connector of a connector with a water ingress protection cover according to an embodiment of the present disclosure.
Figure 5:
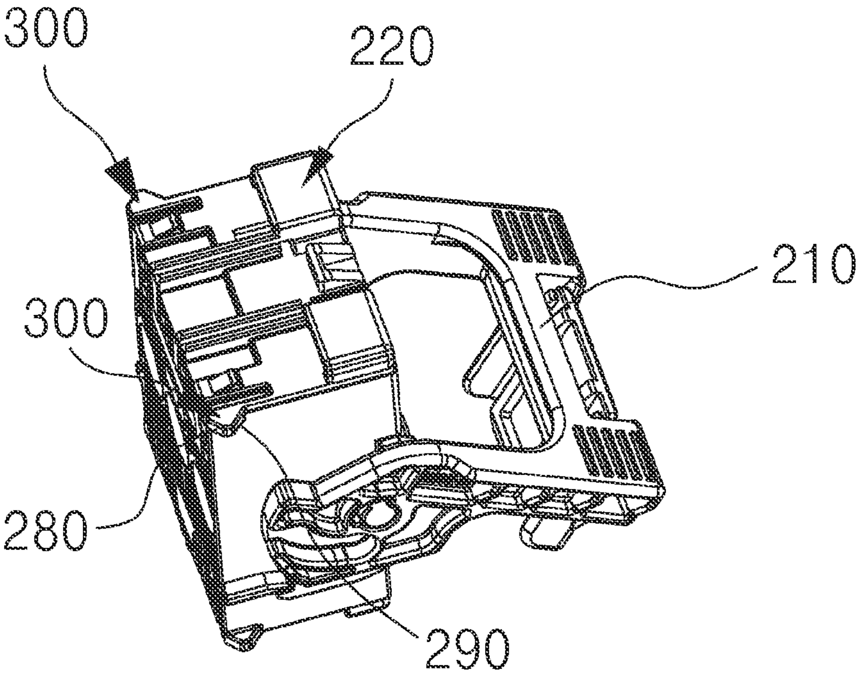
FIG. 5 is a drawing illustrating a male connector in which a second cover is separated from a connector with a water ingress protection cover according to an embodiment of the present disclosure.

Referring to FIG. 4, one side of the second cover 240 is mounted on the upper part of the male connector 200, specifically fixed on the second body 220.

The second cover 240 comprises a second upper surface 241 and a pair of second side surfaces 242 extending downward from both ends of the second upper surface 241.

A third protrusion 250 is formed on one end of the second upper surface 241 and the second side surfaces 242.

The second cover 240 has a protrusion groove 260 formed on the inner surface thereof so that the second protrusion 180 is inserted therein.

The first protrusion 170 through the third protrusion 250 guide water falling on the first upper surface 150 and the second upper surface 241 to flow to the first side surface 160 and the second side surface 242.

The connector comprises a coupling mechanism for coupling the male connector 200 and the first cover 140.

The coupling mechanism includes a first coupling element 270 and a second coupling element 310.

The first coupling element 270 is formed outside the male connector 200.

Figure 14:
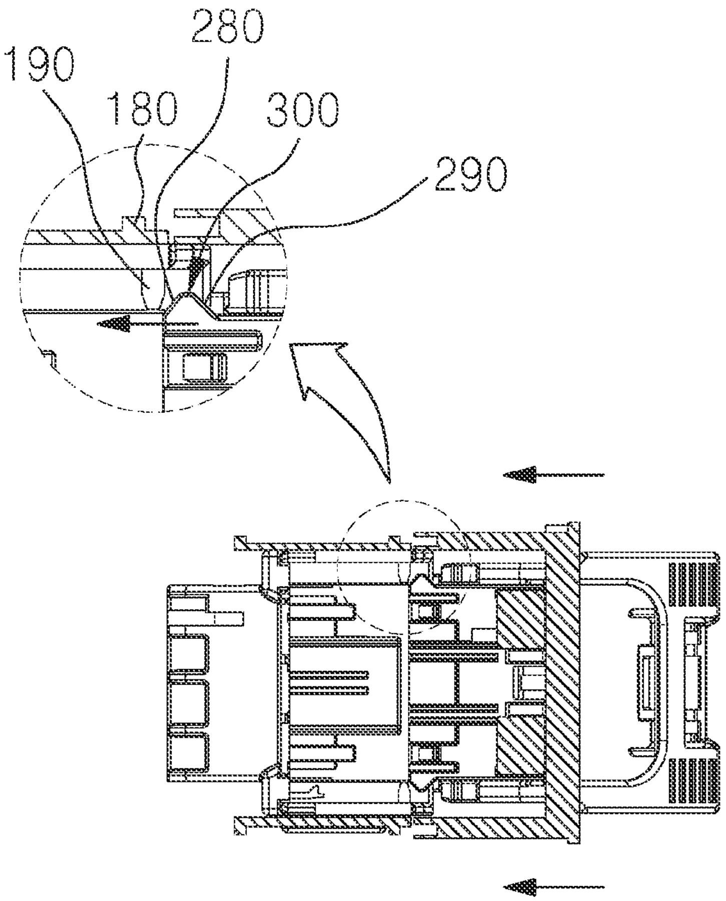
FIG. 14 is a cross-sectional view taken along line A-A of FIG. 13.
Figure 15:
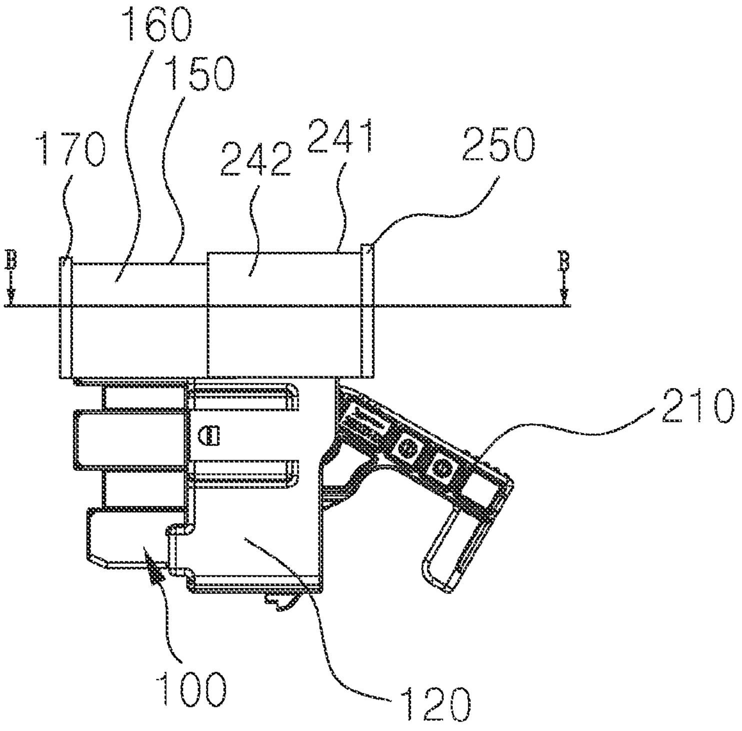
FIG. 15 is a drawing illustrating a state in which a first cover is completely moved from a connector with a water ingress protection cover according to an embodiment of the present invention.

As shown in FIG. 14, the first coupling element 270 comprises a bump 300 comprising a first inclined surface 280 formed on one side thereof and a second inclined surface 290 formed on the other side thereof to be symmetrical to the first inclined surface 280.

The second coupling element 310 is formed on the inner surface of the first side surface 160. The second coupling element 310 includes the protrusion 190 protruding from the inner surface of the first side surface 160.

The coupling mechanism may be applied in another embodiment, and the first coupling element 270 may include the first protrusion 320 formed on the outer surface of the first cover 140, and the second coupling element 310 may include the second protrusion 330 formed on the inner surface of the second cover 240.

Figure 17:
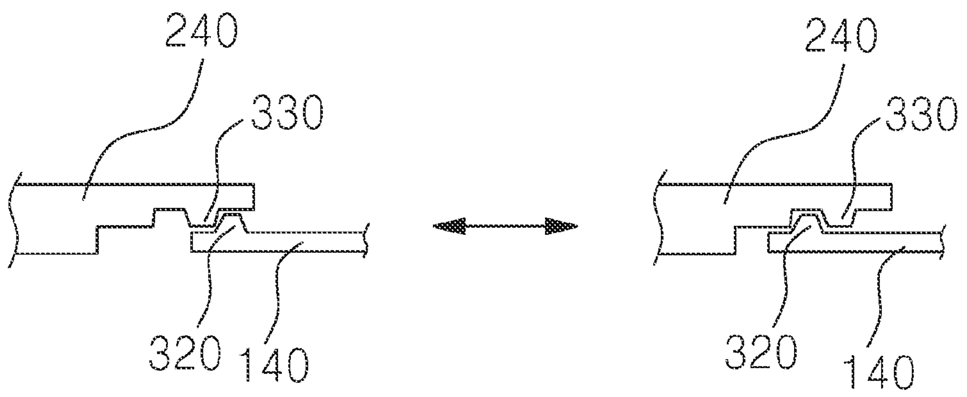
FIG. 17 is a drawing illustrating a state in which a first cover and a second cover are coupled and uncoupled.

The first protrusion 320 and the second protrusion 330 may be coupled as shown in FIG. 17.

Next, a process of coupling the male connector 200 to the second cover 240 after the first cover 140 is moved when the male connector 200 is coupled to the female connector 100 will be described in reference to FIGS. 6 to 16.

Figure 7:
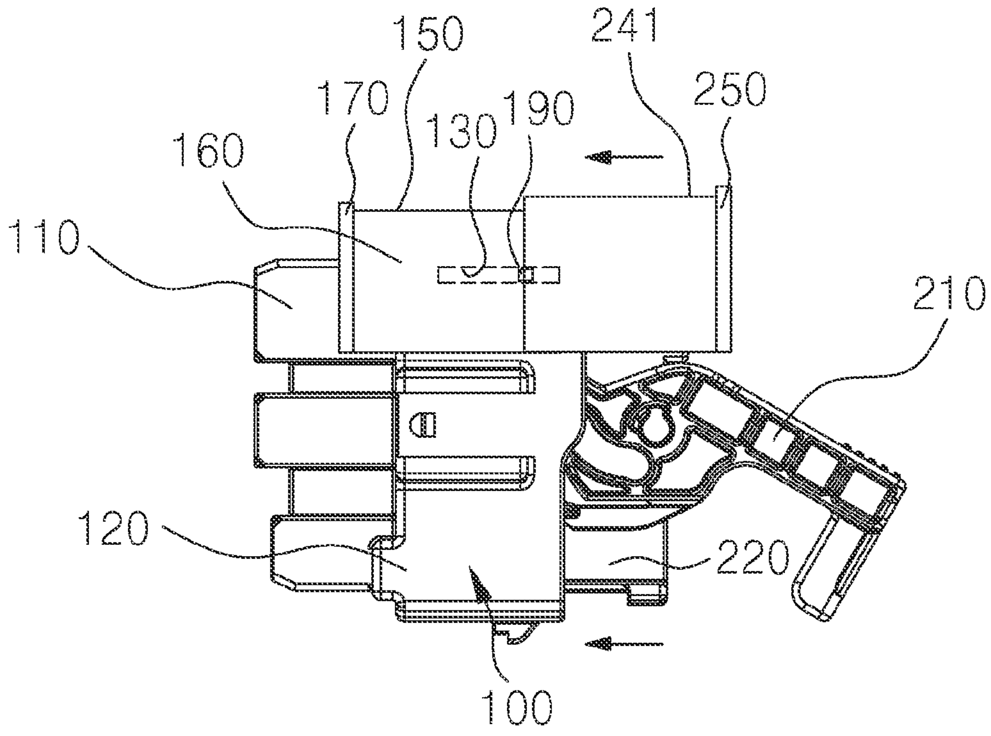
FIG. 7 is a drawing illustrating a state in which a first cover and a second cover are coupled to each other when a male connector and a female connector are coupled to each other in a connector with a water ingress protection cover according to an embodiment of the present disclosure.

When the male connector 200 is coupled to the female connector 100 as illustrated in FIG. 6, the first cover 140 and the second cover 240 are coupled to each other while in contact as illustrated in FIG. 7.

Figure 8:
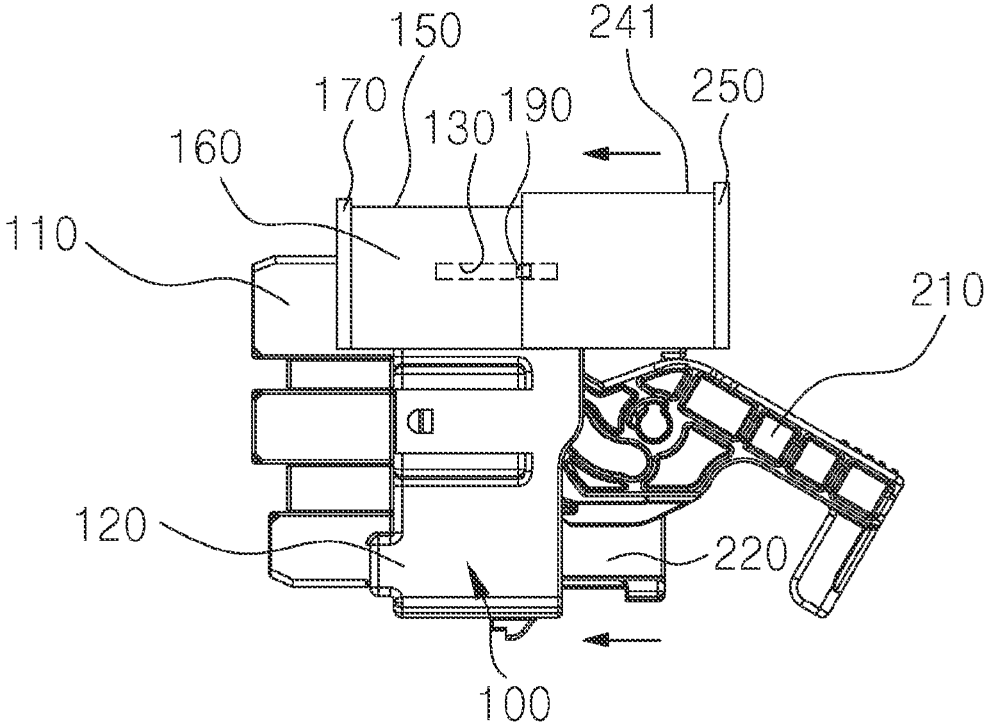
FIG. 8 is a drawing illustrating a state in which a first cover is moved by a second cover in a connector with a water ingress protection cover according to an embodiment of the present disclosure.

As shown in FIG. 8, when the second body 220 of the male connector 200 is inserted into the housing 120 of the female connector 100, the second cover 240 moves the first cover 140 toward the first body 110.

Figure 9:
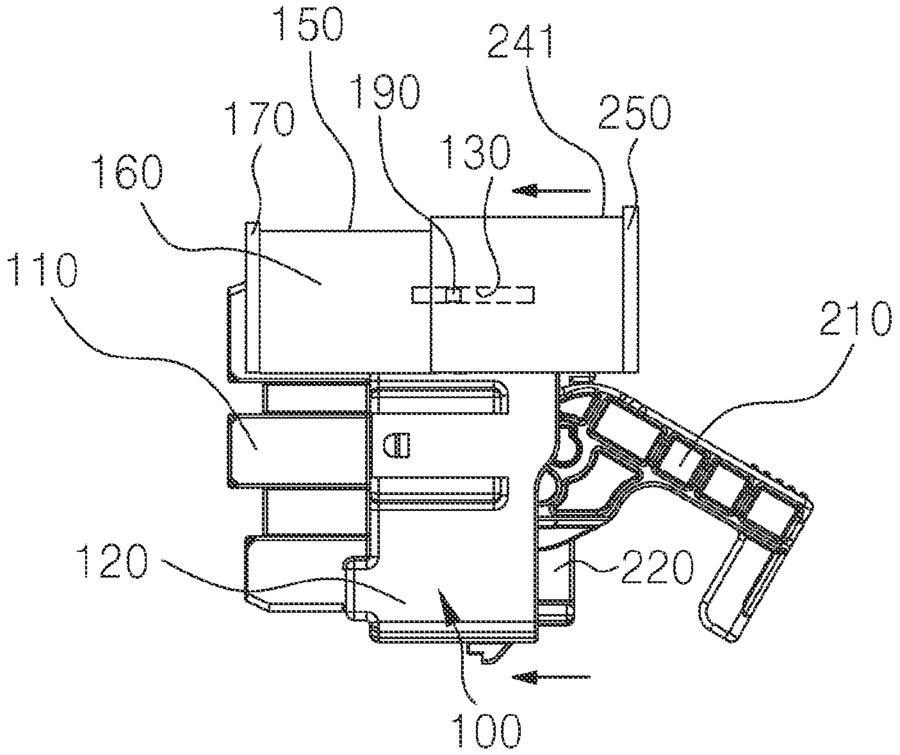
FIG. 9 is a drawing illustrating a state in which a first cover is completely moved from a connector with a water ingress protection cover according to an embodiment of the present invention.

When the second body 220 is inserted into the housing 120, as shown in FIG. 9, the first cover 140 is located above the first body 110, and the second cover 240 is located above the housing 120. Accordingly, the first cover 140 and the second cover 240 cover the entire upper parts of the male connector 200 and the female connector 100.

When the second body 220 is inserted into the housing 120, if the first cover 140 is guided by the guide hole 130 and moved with a predetermined distance, the first inclined surface 280 and the protrusion are in contact with each other as shown in FIG. 14.

Figure 16:
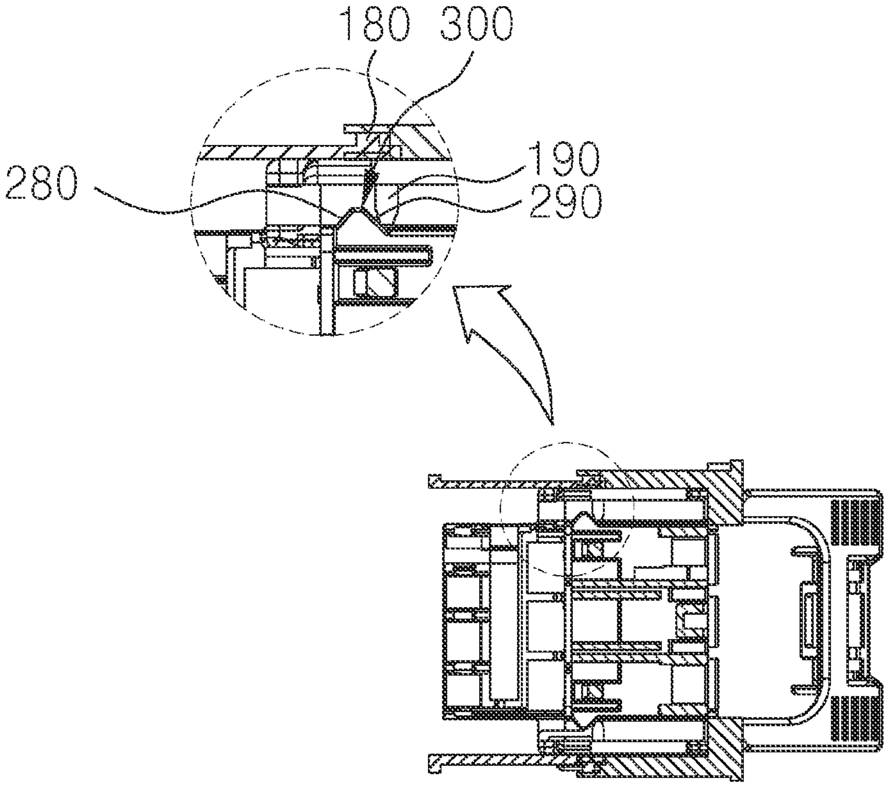
FIG. 16 is a cross-sectional view taken along line B-B of FIG. 15.

In this case, when the second body 220 of the male connector 200 is further inserted into the housing 120, the protrusion moves along the first inclined surface 280 and moves toward the second inclined surface 290 as shown in FIG. 16.

Figure 10:
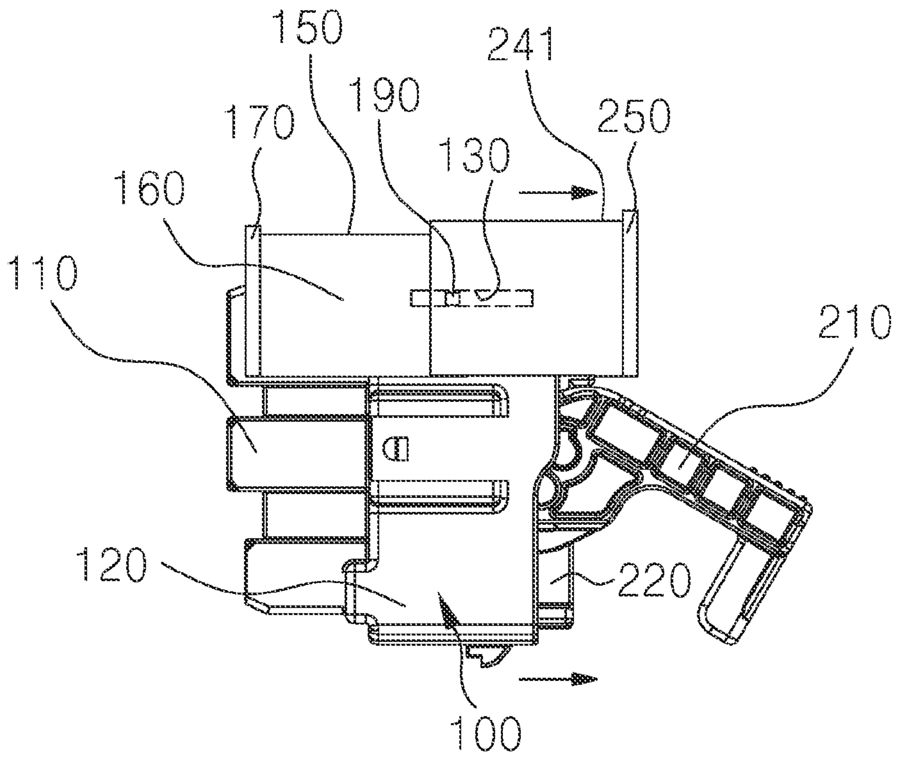
FIG. 10 and FIG. 11 are drawings illustrating a state in which a male connector and a female connector are separated from a connector with a water ingress protection cover according to an embodiment of the present invention and a first cover is moved by the male connector.
Figure 11:
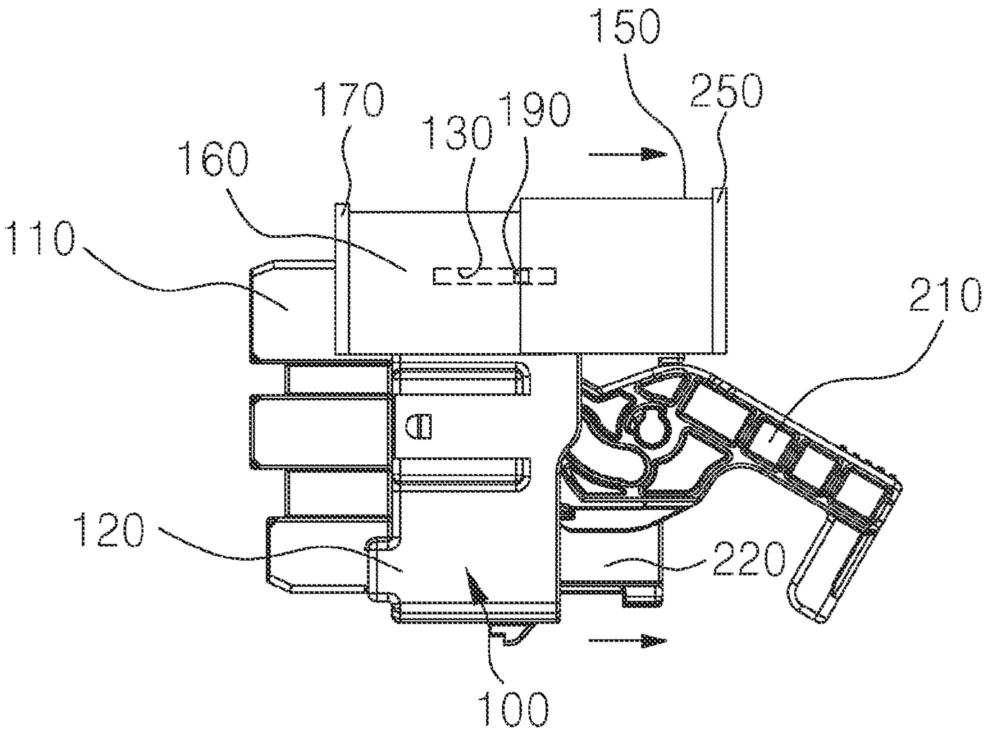

When the male connector 200 is separated from the female connector 100, the male connector moves the first cover 140 in the upper direction of the housing 120 as shown in FIGS. 10 to 12.

In detail, when the second body 220 of the male connector 200 is separated from the housing 120, the second inclined surface 290 contacts the protrusion 190, and when the bump 300 having the second inclined surface 290 formed thereon is moved, the protrusion 190 is moved along the second inclined surface 290 to move the first cover 140 to the upper position of the lower housing 120.

When the movement of the first cover 140 to the upper part of the housing 120 is completed, the male connector 200 and the female connector 100 may be completely separated as the protrusion 190 moves from the second inclined surface 290 to the first inclined surface 280.

In another embodiment, although not shown in the drawings, when the male connector 200 is coupled to the female connector 100, the moved first cover 140 may be slid to the upper part of the housing 120 by the elastic mechanism without the above-mentioned coupling mechanism when the male connector 200 is separated from the female connector 100. The elastic mechanism may be a coil spring.

Although the above description has been focused on exemplary embodiments, these are merely examples and embodiments of the present invention are not limited thereto, and it will be understood by those skilled in the art that various modifications and applications that are not illustrated above may be made without departing from the essential characteristics of the present embodiments. For example, each component specifically shown in the embodiments may be modified and implemented. Further, the differences related to the modifications and applications should be interpreted as being included in the scope of embodiments of the present invention defined in the appended claims.

What is claimed is:

1. A connector with a water ingress protection cover, the connector comprising:

a female connector comprising a housing having a pair of guide holes extended along a first direction at both sides thereof and a first body extended from the housing;

a male connector;

a first cover mounted to an upper part of the female connector to be movable along the pair of guide holes; and a second cover mounted to an upper part of the male connector;

wherein the first cover is configured to move in the first direction to a position over the first body by the second cover or the male connector during coupling of the male connector to the female connector; and wherein the second cover is positioned over the housing and coupled to the first cover in a state in which the male connector is coupled to the female connector.

2. The connector of claim 1, wherein the first cover is configured to be moved to a position over the housing by the second cover or the male connector during separating of the male connector from the female connector.

3. The connector of claim 1, wherein:

the first cover comprises:

a first upper surface; and first side surfaces extending downward from both ends of the first upper surface; and the second cover comprises:

a second upper surface; and second side surfaces extending downward from both ends of the second upper surface.

4. The connector of claim 3, further comprising:

a first protrusion at a first end in the first direction on outer surfaces of the first upper surface and the first side surfaces;

a second protrusion at a second end on outer surfaces of the first upper surface and the first side surfaces; and a third protrusion at a first end in the first direction on outer surfaces of the second upper surface and the second side surfaces.

5. The connector of claim 4, wherein the second protrusion is spaced a predetermined distance apart from the second end in the first direction.

6. The connector of claim 4, wherein the second cover comprises a protrusion groove configured to receive the second protrusion.

7. A connector with a water ingress protection cover, the connector comprising:

a female connector comprising a housing having a pair of guide holes extended along a first direction at both sides thereof and a first body extended from the housing;

a male connector;

a first cover mounted to an upper part of the female connector to be movable along the pair of guide holes; and a second cover mounted to an upper part of the male connector;

a coupling mechanism coupling the male connector and the first cover;

wherein the first cover is configured to move in the first direction to a position over the first body by the second cover or the male connector during coupling of the male connector to the female connector; and wherein the second cover is positioned over the housing and coupled to the first cover in a state in which the male connector is coupled to the female connector.

8. The connector of claim 7, wherein the coupling mechanism comprises a first coupling element on the male connector or the second cover and a second coupling element in the first cover.

9. The connector of claim 8, wherein:

the first coupling element comprises a bump comprising a first inclined surface at a first side thereof and a second inclined surface at a second side thereof; and the second coupling element comprises a pair of protrusions protruding from inner surfaces of the first cover and coupled to the pair of guide holes.

10. The connector of claim 8, wherein:

the first coupling element comprises a first protrusion on an outer surface of the first cover; and the second coupling element comprises a second protrusion on an inner surface of the second cover.

11. The connector of claim 7, wherein the first cover is configured to be moved to a position over the housing by the second cover or the male connector during separating of the male connector from the female connector.

12. The connector of claim 7, wherein:

the first cover comprises:

a first upper surface; and first side surfaces extending downward from both ends of the first upper surface; and the second cover comprises:

a second upper surface; and second side surfaces extending downward from both ends of the second upper surface.

13. The connector of claim 12, further comprising:

a first protrusion at a first end in the first direction on outer surfaces of the first upper surface and the first side surfaces;

a second protrusion at a second end on outer surfaces of the first upper surface and the first side surfaces; and a third protrusion at a first end in the first direction on outer surfaces of the second upper surface and the second side surfaces.

14. The connector of claim 13, wherein the second protrusion is spaced a predetermined distance apart from the second end in the first direction.

15. The connector of claim 13, wherein the second cover comprises a protrusion groove configured to receive the second protrusion.

16. A connector with a water ingress protection cover, the connector comprising:

a female connector comprising a housing having a pair of guide holes extended along a first direction at both sides thereof and a first body extended from the housing;

a male connector;

a first cover mounted to an upper part of the female connector to be movable along the pair of guide holes, the first cover comprising:

a first upper surface; and first side surfaces extending downward from both ends of the first upper surface; and a second cover mounted to an upper part of the male connector, the second cover comprising:

a second upper surface; and second side surfaces extending downward from both ends of the second upper surface;

wherein the first cover is configured to move in the first direction to a position over the first body by the second cover or the male connector during coupling of the male connector to the female connector;

wherein the second cover is positioned over the housing and coupled to the first cover in a state in which the male connector is coupled to the female connector; and wherein the first cover is configured to be moved to a position over the housing by the second cover or the male connector during separating of the male connector from the female connector.

17. The connector of claim 16, further comprising:

a first protrusion at a first end in the first direction on outer surfaces of the first upper surface and the first side surfaces;

a second protrusion at a second end on outer surfaces of the first upper surface and the first side surfaces; and a third protrusion at a first end in the first direction on outer surfaces of the second upper surface and the second side surfaces.

18. The connector of claim 17, wherein the second protrusion is spaced a predetermined distance apart from the second end in the first direction.

19. The connector of claim 17, wherein the second cover comprises a protrusion groove configured to receive the second protrusion.

20. The connector of claim 17, further comprising a coupling mechanism coupling the male connector and the first cover.

* * * * *